(12) United States Patent
Thibodeaux, Jr.

(10) Patent No.: US 6,249,390 B1
(45) Date of Patent: Jun. 19, 2001

(54) MAGNIFYING INSERT FOR A BINDER

(76) Inventor: Larry J. Thibodeaux, Jr., 1337 Nursery Pl., Metairie, LA (US) 70005

( * ) Notice: Subject to any disclaimer, the term of this patent is extended or adjusted under 35 U.S.C. 154(b) by 0 days.

(21) Appl. No.: 09/507,994

(22) Filed: Feb. 20, 2000

Related U.S. Application Data

(60) Provisional application No. 60/148,296, filed on Aug. 10, 1999.

(51) Int. Cl.[7] .................................................. G02B 27/02
(52) U.S. Cl. ........................................... 359/802; 359/806
(58) Field of Search ..................... 359/802, 803, 359/804, 806, 807, 809, 436, 440; D16/135, 136; 33/492, 493, 494

(56) References Cited

U.S. PATENT DOCUMENTS

| | | | |
|---|---|---|---|
| 3,324,823 | 6/1967 | Peters | 116/236 |
| 4,293,190 | 10/1981 | Clover | 359/802 |
| 5,333,907 | 8/1994 | Schaeffer | 281/42 |
| 5,471,347 | 11/1995 | Galiani | 359/807 |
| 5,501,019 | * 3/1996 | Concari et al. | 33/494 |
| 5,610,770 | 3/1997 | Galiani | 359/807 |
| 5,695,346 | * 12/1997 | Sekiguchi et al. | 434/365 |

* cited by examiner

*Primary Examiner*—Georgia Epps
*Assistant Examiner*—David Seyfari
(74) *Attorney, Agent, or Firm*—Kenneth L. Tolar

(57) ABSTRACT

A magnifying insert designed particularly for a binder having separable binding members for securing pages of printed material therein includes a substantially rectangular panel having a pair of side edges, a top edge and a bottom edge. The panel is a Fresnel lens for magnifying small or unreadable indicia on the pages secured within the binder. Along an edge of the panel are a plurality of apertures, each spaced, dimensioned and positioned to receive a select binding member. The panel can be interchangeably used as a conventional insert, a divider, a page mark or as a magnifying lens for enlarging fine print appearing on the bound pages. The panel can also include measurement indicia along an edge thereof allowing the device to also function as a measuring tool.

12 Claims, 3 Drawing Sheets

MAGNIFYING INSERT FOR A BINDER

The following application is entitled to the filing date of Provisional Application No. 60/148,296 filed on Aug. 10, 1999.

BACKGROUND OF THE INVENTION

The present invention relates to an insert securable within a binder that is constructed with a magnifying, transparent material allowing a user to conveniently magnify printed material within the binder. Furthermore, the insert may include measuring indicia thereon allowing it to be used as both a measuring device and a magnifier when removed from the binder.

DESCRIPTION OF THE PRIOR ART

Technical manuals, treatises, organizers and similar publications often include a rigid binder with ring or post-type binding members along a side or top edge thereof. Each page of the printed material likewise includes a plurality of apertures along a side or top edge thereof, each of which receive a select binding member allowing individual pages to be removed or added. However, reading such publications can be strenuous and difficult, especially for the elderly or visually impaired, in that the printed indicia is often extremely small. Therefore, there is currently a need for a device which allows a reader to conveniently magnify unreadable indicia on such bound printed material. Although conventional magnifying glasses could be used, they are not always readily available and are typically too small to magnify an entire page.

Although various magnifying inserts for bound printed material exists, they are difficult to use, manufacture and/or attach to a binder. Furthermore, none are specifically designed for a binder of the type described above. For example, U.S. Pat. No. 5,333,907 issued to Schaeffer discloses a magnifying insert for a book having a transparent first section, a flexible second section fixedly attached to the first section and a magnifying lens section fixedly attached to the second section. Each section may be folded relative to the others allowing the magnifying lens section to be positioned over a page having fine print or indicia thereon. The magnifying lens section may be a Fresnel lens.

U.S. Pat. No. 5,610,770 issued to Galiani relates to a lens magnification system for restaurant menus or similar booklets including a Fresnel lens pivotally and linearly moveable on a frame that is positioned between pages of the booklet. Other embodiments include the lens being physically connected to the structure of the booklet by one or more accordion connectors allowing the lens to be manually moved between a storage and operable position. Another embodiment relates to a folding container having pockets for receiving maps and other printed matter. The pocket is defined by a front and rear wall with the front wall being constructed with a magnifying lens. Accordingly, the front wall magnifies indicia appearing on documents placed within the pocket.

U.S. Pat. No. 5,471,347 issued to Galiani relates to a lens magnification system for booklets as described in Galiani '770, supra.

U.S. Pat. No. 4,293,190 issued to Clover relates to a transparency viewer comprising a screen for mounting an array of transparency images in a grid pattern. A viewing member is movable over the array for viewing any selected image thereof.

U.S. Pat. No. 3,324,823 issued to Peters relates to a bookmark.

Although magnifying inserts exist, none are designed to be mounted within ring or telescoping post type binders. The insert includes binder ring receiving apertures along a side or top edge thereof allowing the insert to be secured within the binder similarly to the printed material. Furthermore, measurement indicia are disposed along an edge of the insert thereby increasing the versatility thereof.

SUMMARY OF THE INVENTION

The present invention relates to a magnifying insert for a binder. The device comprises a substantially rectangular panel having a pair of opposing longitudinal side edges, a top edge and a bottom edge. The panel is constructed entirely with a transparent, magnifying material, such as that commonly referred to as a Fresnel lens and has sufficient flexibility to allow it to be bent onto itself. The panel is slightly larger than each page of the printed matter retained within the binder so that the device can be used as a page mark or a divider. Along one of the edges of the panel are a plurality of apertures, each spaced, dimensioned and positioned to receive one of the retaining members within the binder. Measurement indicia can be disposed along another edge allowing the device to be used as a measuring tool as well. The flexibility of the panel allows it to be bent onto itself to magnify the measurement indicia or an object being measured, if desired. Accordingly, the panel may be secured within the binder in a manner similar to that of the pages and used as a conventional insert. If the indicia on the any of the pages are unreadable, the device may be easily separated from the binder and placed above the unreadable page to magnify the indica appearing thereon.

It is therefore an object of the present invention to provide a magnifying insert for a binder that is easy-to-use and inexpensive-to-manufacture.

It is another object of the present invention to provide a magnifying insert for a binder which can be easily secured within a binder.

It is yet another object of the present invention to provide a magnifying insert for a binder uniquely configured to be retained within a ring or post type binder. Other objects, features, and advantages of the present invention will become readily apparent from the following detailed description of the preferred embodiment when considered with the attached drawings and the appended claims.

DESCRIPTION OF THE PREFERRED EMBODIMENT

Figure 3:
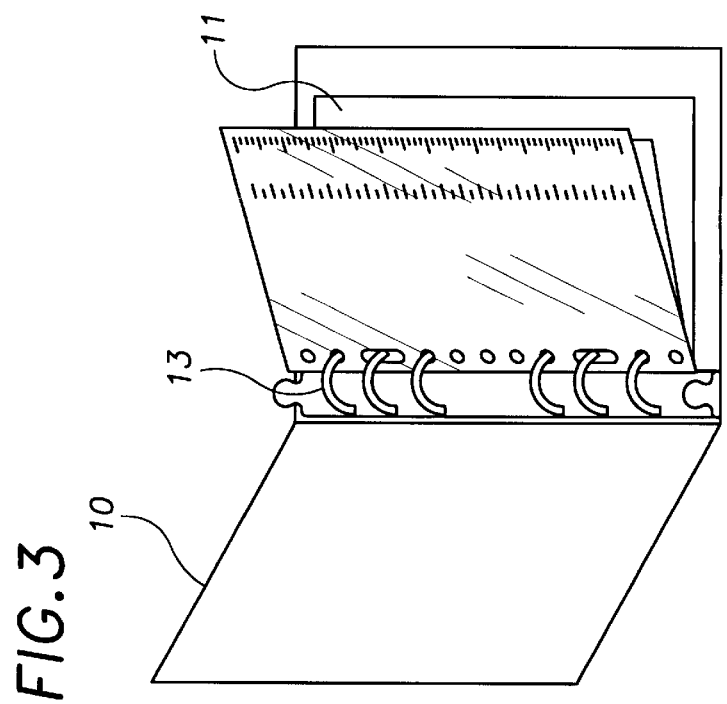
FIG. 3 is a perspective view of a binder with the embodiment depicted in FIG. 2 secured therein.

Binders are often used for treatises, technical manuals, reference manuals, business organizers, charts, financial data and similar collections of printed material. As depicted in FIG. 3, the binders typically include a hard enclosure 10 for surrounding and retaining a plurality of individual pages 11. The enclosure includes front and rear panels with a side panel therebetween. Attached to the interior surface of the side panel are a plurality of separable binding members such as rings 13, telescoping posts or similar means. Certain binders include a top or bottom panel instead of a side panel with the rings or posts positioned on or adjacent thereto. Each page of printed material includes a plurality of apertures along a side or top edge, each for receiving a select binding member to secure the page within the binder.

Figure 1:
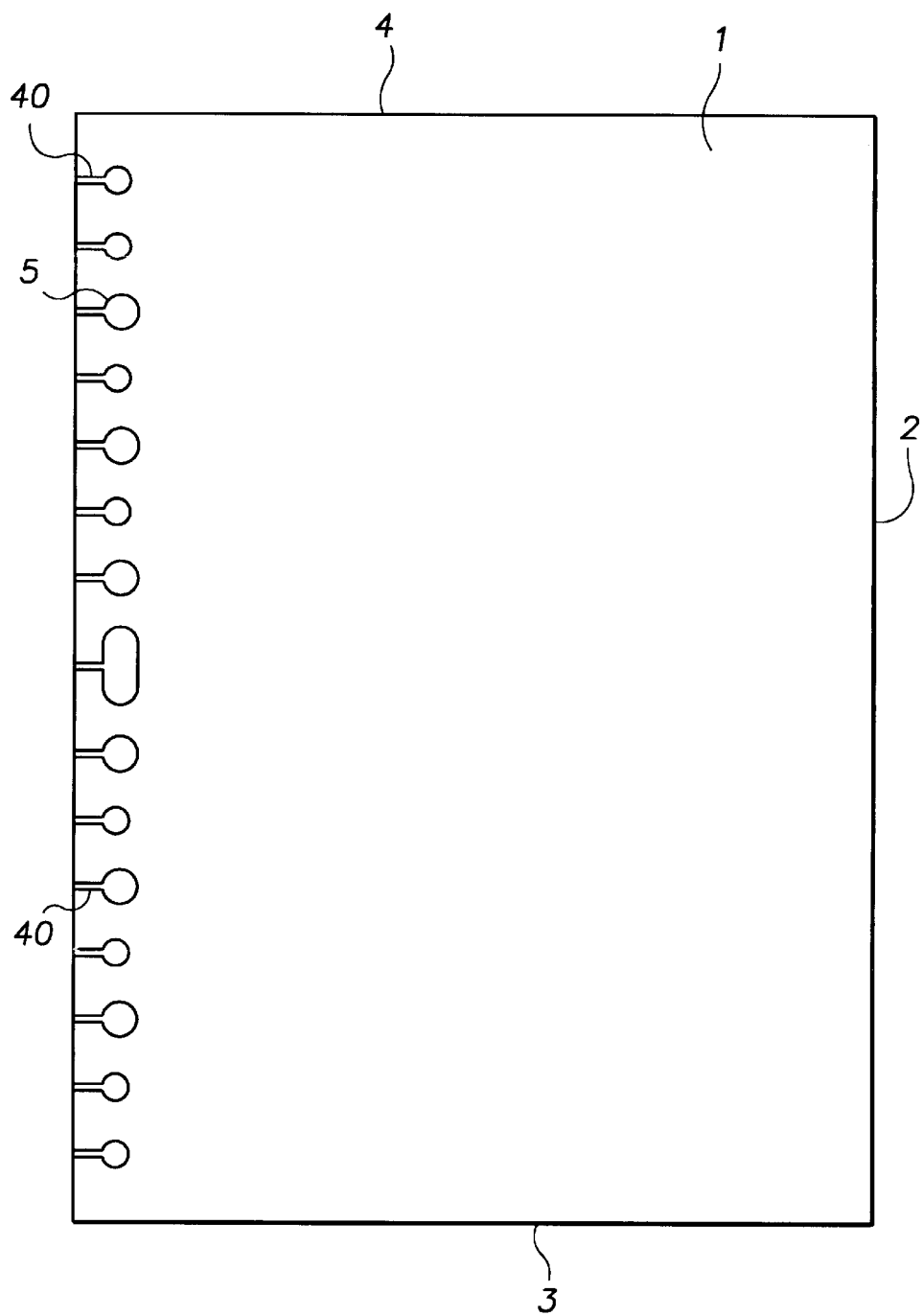
FIG. 1 is a plan view of the magnifying insert according to the present invention.

The present invention relates to a magnifying insert for a binder of the type described above. Now referring to FIG. 1, the insert includes a substantially rectangular panel 1 having a pair of opposing side edges 2, a top edge 3 and a bottom edge 4. The panel is constructed with a slightly rigid, but somewhat flexible, transparent magnifying material such as that commonly referred to as a Fresnel lens. The panel has sufficient flexibility to be bent onto itself for reasons described in more detail below. As depicted in FIG. 3, the panel is preferably slightly larger than the individual pages 11 allowing the insert to function as a divider.

Along one of the edges of the panel are a plurality of apertures 5, each spaced, positioned and dimensioned to receive a select binding member 13 within the binder. Accordingly, the panel may be secured within the binder in a similar manner as the individual pages of printed material. Also, the panel could include a slot 40 extending from each aperture to the adjacent edge allowing the panel to be quickly secured within or detached from the binder without separating the binding members.

Figure 2:
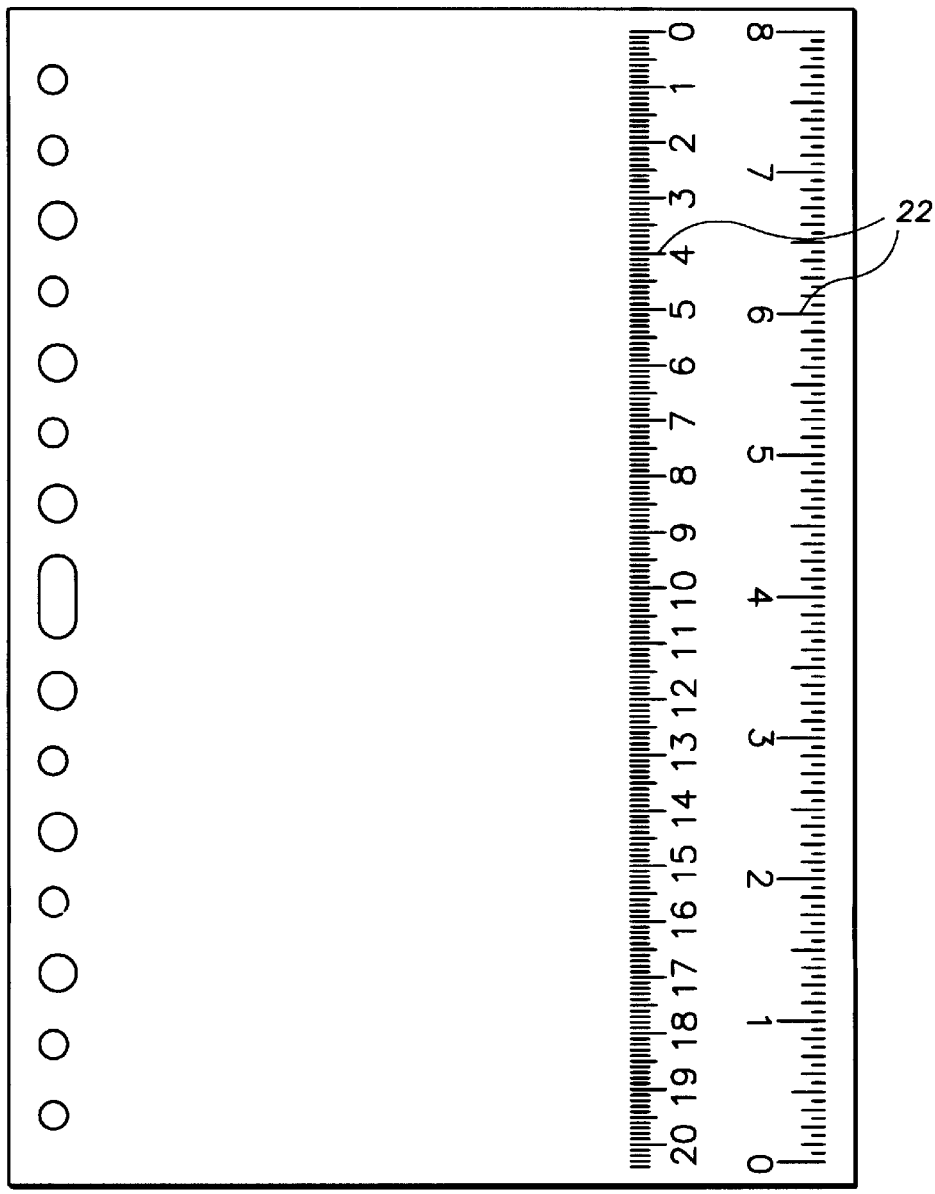
FIG. 2 is a plan view of a second embodiment of the present invention.

A second embodiment is depicted in FIGS. 2 and 3. In the second embodiment, the panel may include a plurality of measurement indicia 22 along an edge thereof allowing the insert to be used as a measuring tool as well. Various units such as metric or standard could be used. By bending the panel onto itself, a user can magnify the measurement indicia, if desired.

Figure 4:
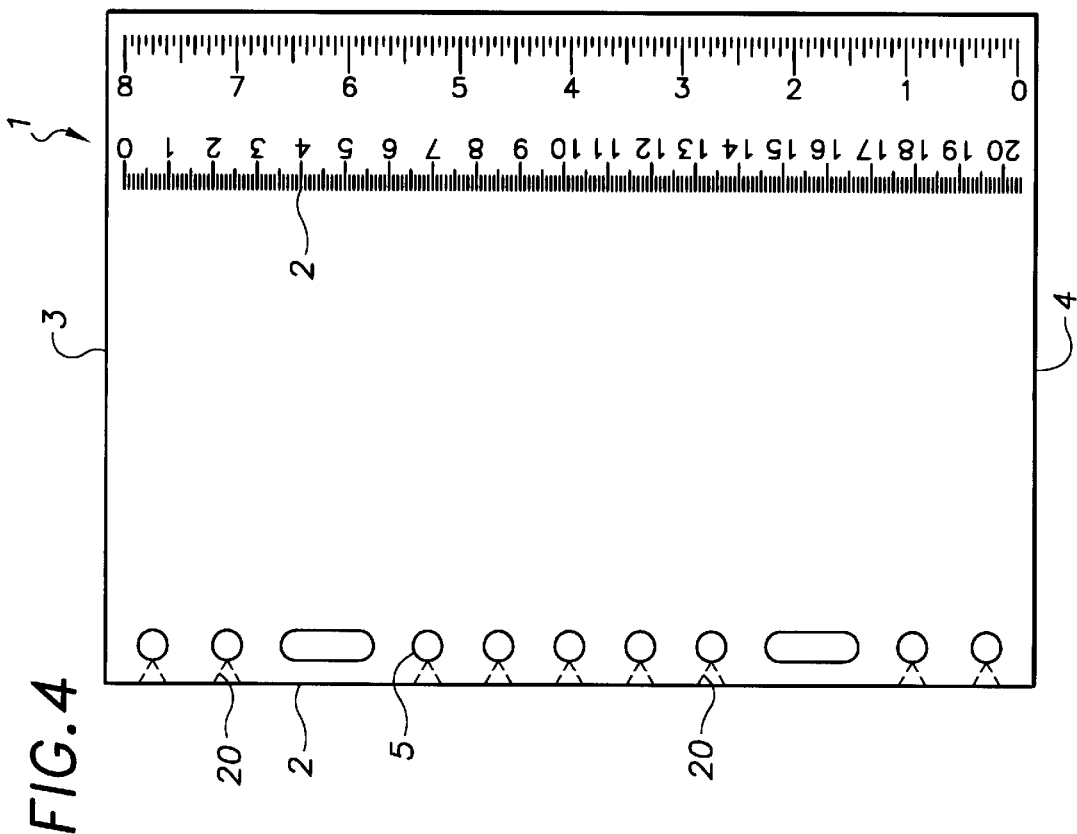
FIG. 4 is a plan view of a third embodiment.

Yet a third embodiment is depicted in FIG. 4. In this embodiment, dotted, dashed or broken lines 20 forming a predetermined pattern could be placed on the upper surface of the panel with the lines extending from each aperture to the adjacent side edge of the panel. The broken lines provide a template to assist a user in cutting a slot having the predetermined pattern, if desired. Therefore, the panel could be quickly secured within or removed from the binder without separating the binding members. Although the lines are depicted as forming a substantially V-shaped pattern, any other suitable patterns can be provided as well.

As is now readily apparent from the above description, the present invention provides a magnifying panel that also functions as a conventional insert, i.e. as a page mark, a divider or a protective cover. If printed indicia on a select page is unreadable, the insert can be easily detached from the binding members and reattached immediately above the select page to magnify the indicia thereon. The attached panel is then moved upwardly or downwardly to achieve a desired degree of magnification. Furthermore, the insert can be detached, if desired, and used as a measuring tool.

The above described invention is not limited to the exact details of construction enumerated above. Although an insert for a seven ring binder is depicted, the device can be constructed for binders having any number of variably configured and spaced rings or posts. Furthermore, the panel could have apertures along the top edge for securing the within a "top punch" or a "bottom punch" binder. The size and shape of the panel can be varied to fit within a particular size binder. However, as discussed above, the slightly rigid panel preferably has sufficient size and flexibility to allow it to be bent back onto itself so that the measurement indicia can be magnified as well. In addition, the slots allow the binder to be secured within or removed from a binder without separating the binding members or to be secured to binding members that are not separable. Finally, the panel can be constructed with or without the slots, the broken lines or the measurement indica, or may include any combination thereof.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A magnifying insert for a binder comprising:
   a panel constructed with a transparent, magnifying lens material, said panel having at least one edge with a plurality of apertures adjacent thereto, said apertures spaced, positioned and variably dimensioned to receive a select binding member on a binder.

2. A magnifying insert according to claim 1 wherein said panel includes a second edge with measurement indicia adjacent thereto.

3. A magnifying insert according to claim 1 wherein said panel is a Fresnel lens.

4. A magnifying insert according to claim 3 wherein said panel further includes a slot extending from each of said apertures to the adjacent edge of said panel so that said panel is securable within and removable from the binder without separating the binding members.

5. A magnifying insert according to claim 2 wherein said panel has sufficient size and flexibility to allow said panel to be bent onto itself so that a portion of said panel is superimposed on said measurement indicia to magnify said indicia.

6. In combination with a binder having a plurality of separable binding members for securing pages of printed material therein, each of said pages having a plurality of apertures along an edge thereof, each page aperture for receiving a select one of said binding members to retain said pages within said binder, a magnifying insert comprising:
   a panel constructed with a transparent, magnifying lens material, said panel having at least one edge with a plurality of apertures adjacent thereto, said apertures spaced, positioned and variably dimensioned to receive a select one of said binding members.

7. A magnifying insert according to claim 6 wherein said panel has a slightly larger dimension than each of said pages allowing said panel to function as a divider.

8. A magnifying insert according to claim 7 wherein said panel includes a second edge having measurement indicia adjacent thereto.

9. A magnifying insert according to claim 8 wherein said panel has sufficient size and flexibility to allow said panel to be bent onto itself so that a portion of said panel is superimposed on said measurement indicia to magnify said indicia.

10. A magnifying insert according to claim 6 wherein said panel is a Fresnel lens.

11. A magnifying insert according to claim 10 wherein said panel further includes a slot extending from each of said apertures to the adjacent edge of said panel so that said panel is securable within and removable from the binder without separating the binding members.

12. A magnifying insert according to claim 10 wherein said panel includes broken lines formed thereon, said broken lines forming a predetermined pattern and extending from each aperture on said panel to the adjacent edge thereof, said broken lines forming a template that assists a user in cutting a slot having the predetermined pattern so that said panel is removable from and securable within said binder without separating said binding members.

* * * * *